May 1, 1956 — J. A. GAYLORD — 2,743,891
BAROMETRIC PARACHUTE RELEASE
Filed Oct. 12, 1953
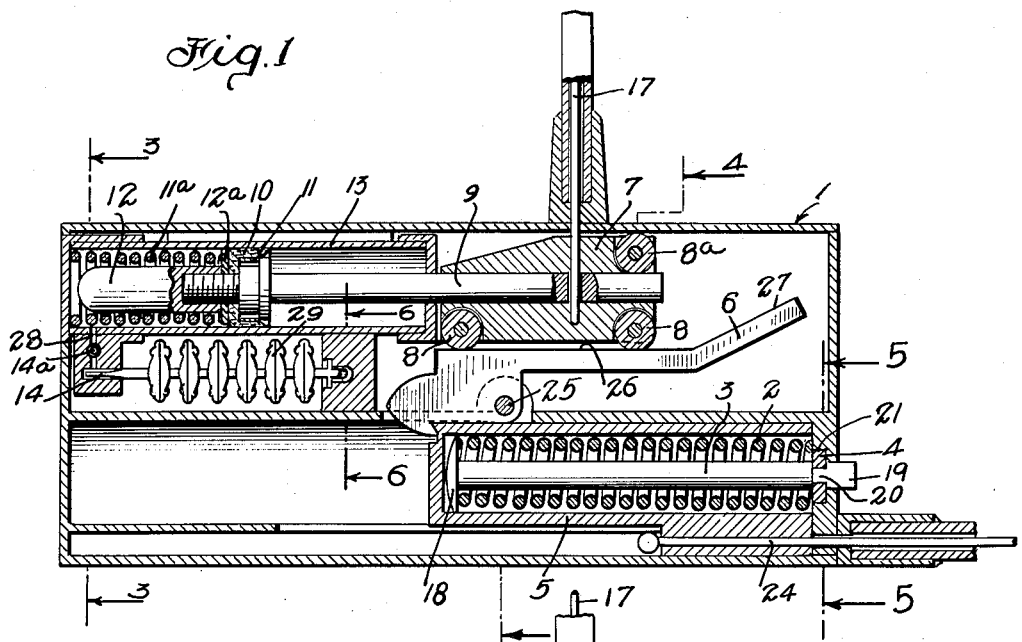
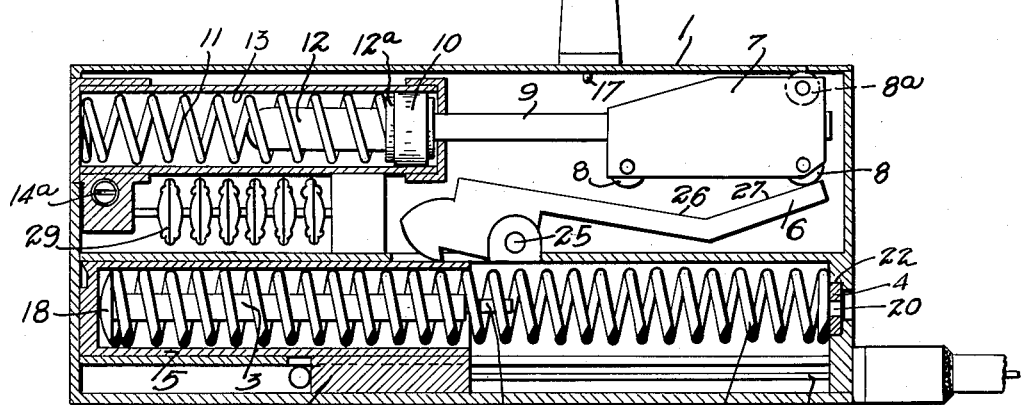
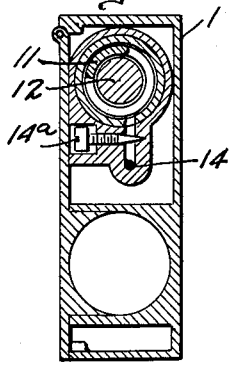
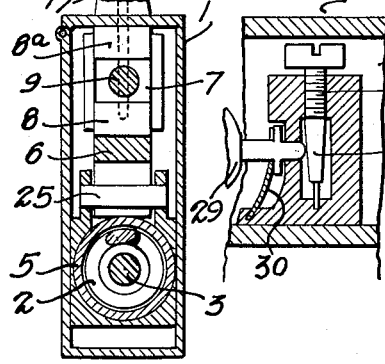
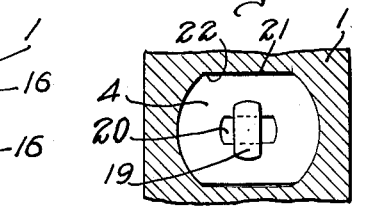
INVENTOR.
JOHN A. GAYLORD
BY Lyon & Lyon
ATTORNEYS

United States Patent Office 2,743,891
Patented May 1, 1956

2,743,891

BAROMETRIC PARACHUTE RELEASE

John A. Gaylord, Pacific Palisades, Calif.

Application October 12, 1953, Serial No. 385,516

3 Claims. (Cl. 244—150)

This invention relates to a device which is set in operation automatically at a predetermined barometric pressure and which, at a time interval as it is set in operation, will automatically release a parachute by operating the jerk cord therefor.

In a parachute fall from a high altitude it is desirable to delay operation of the jerk cord which releases the parachute for a rather long period of fall. It is then desired that a parachute be opened at some predetermined altitude. Thus, for example, where a descent is to be made from an altitude such as 30,000 feet, it is desirable to delay opening of the parachute until a comparatively low altitude, such as 7000 feet, is arrived at. Otherwise the operator will be maintained at the very highest altitudes for an undesirable length of time under extreme low temperature conditions and without adequate oxygen supply and at the end of the fall of some 23,000 feet the operator may not be properly alert for operating the parachute.

It is a general object of the present invention to provide an automatic device for releasing the parachute set in operation at a predetermined barometric pressure.

It is a further object of the present invention to provide a barometric release device for a parachute which incorporates a time delay mechanism.

A further object of the present invention is to provide a barometric release for a parachute which can be constructed with as few parts as possible, which is lighter in weight and which is susceptible of continued use.

The barometric release of the present invention together with further objects and advantages of the invention, will be more fully understood from the following description of the preferred example of the invention. The preferred example of the invention is described in connection with the accompanying drawings, in which—

Figure 1 is an elevation mainly in vertical section of the device in closed or locked position;

Figure 2 is a similar elevation after actuation or release of the device;

Figure 3 is a section substantially on the line 3—3 of Figure 1;

Figure 4 is a section substantially on the line 4—4 of Figure 1;

Figure 5 is a section substantially on the line 5—5 of Figure 1; and

Figure 6 is a fragmentary section of the diaphragm pressure regulating screw on the line 6—6 of Figure 1.

Referring to the drawings, 1 indicates a case. 2 indicates a precompressed spring which is held in compressed position by a bar 3 which is flanged at one end 18 to support one end of the spring and is provided with the washer 4 at the other end. The bar 3 at the end where it is receiving the washer is flattened, as indicated at 19. The washer 4 has a square opening 20 to slip over the flattened end 19 of the bar 3 so as to hold the precompressed spring 2 in the compressed position. The washer 4 is further provided with the flattened side 21 and the case is provided with a recess 22 with flattened sides for engaging the washer 4 and preventing rotation thereof.

A spring shuttle case 5 is provided enclosing the pecompressed spring 2 and is attached to a block 23 having an opening therethrough by means of which a jerk cord 24 may be secured to the shuttle 5. In practice it is to be understood that the jerk cord 24 is a jerk cord for releasing a parachute (not shown). The shuttle case 5 is in contact with a shuttle trip arm 6 pivoted, as indicated at 25, to the case and having a flat upper wall 26 and to the rear of which is provided the upwardly slanting wall 27. Mounted upon the flat wall 26 of the shuttle trip arm 6 is a car 7 which is movable into engagement with the inclined portion 27 of the shuttle arm to pivot that shuttle arm so as to release the spring shuttle case 5.

The car 7 is provided with two wheels or rollers 8 by which it has rolling contact with the shuttle arm and there is an additional roller 8a by which it makes rolling contact with the top wall of the case 1. The car is normally restrained from movement by a release pin 17 which passes through a hole in the car 7. In practice the release pin 17 is pulled from the device at the instant the parachutist jumps from a plane. The car 7 is rigidly connected with a shaft 9 which leads from a dashpot. Said dashpot includes a piston formed on one end of the shaft 9, preferably by the use of a cup leather 10 mounted upon an offset section of the shaft 9. A flat expansion spring 11 is preferably provided within the cup leather 10 to insure sealing contact between the cup leather and the polished inside of the cylinder 13 of the dashpot. The end of the shaft 9 is further provided with a nut 12 which engages a washer 12a in contact with the cup leather 10. Between the cylinder walls 13 and the washer 12a is the precompressed spring 11a normally urging the shaft 9 to the right as viewed in the figures. The nut 12 is made of such size as to substantially fill (within about 10%) all of the vacuum volume between the end of the cylinder 13 and the cup leather 10 in order to develop a maximum vacuum back of the cup leather for retarding the motion of the shaft 9.

Into this vacuum area an air passage 28 leads and in said air passage there is provided an adjustable needle valve 14a. There is also provided a second needle valve 14 for controlling the air flow through the passage 28 into the vacuum chamber of the dashpot, which needle valve is actuated by the diaphragm 29 responsive to atmospheric pressure. The diaphragm 29 moves the needle valve 14 to the right to progressively open the passage whenever the barometric pressure exceeds a certain preset value. Leaf spring 30 urges diaphragm 29 to the right in Figure 6. In order to provide an adjustment of the barometric pressure at which the needle valve 14 will move to open the passage 28 the diaphragm-actuated needle valve at its right end is in contact with a regulating screw 16.

In the operation of the barometric release of the present invention the precompressed spring 2 is normally restrained from movement by the washer 4. Whenever, however, it is desired to utilize the release, the bar 3 is rotated to align the openings of the washer 4 with the squared end of the shaft 3, at which time the precompressed spring 2 is ready to violently move to the left, as viewed in the figures, whenever the trip arm 6 is actuated. When the parachutist jumps from a plane the release pin 17 is withdrawn leaving the car 7 free to travel to the right for operating the trip arm 6. This action is inhibited by the vacuum behind the leather cup 10 until the diaphragm actuated needle valve 14 is operated by the parachutist falling at the barometric pressure at which the device is designed to operate, whereupon air enters through passage 28 into the vacuum space permitting the shaft 9 to move car 7 to the right and pivot the trip arm 16 out of the way of the spring shuttle case 5 at which instance the spring shuttle case is jerked violently to the left by the precompressed spring 2 jerking the parachute ripcord to the open position.

The actuated needle valve 14a is provided in the device for operation in the event the parachutist jumps from a level below that corresponding to the barometric pressure where needle valve 14a is designed to open. In such a case the diaphragm valve 14 will be open at the instant the parachutist jumps from the plane. The needle valve 14a is adjustable so as to provide a desired time interval before opening of the parachute, such for example, as four seconds. Thus in the event the parachutist jumps below the barometric pressure for which the barometric release is designed to operate the device still provides an automatic four seconds delay and then automatically opens the parachute.

The device of the present invention is thus constructed in a small size with a total weight of less than a pound consisting of a fewer number of parts, all parts of which are easily accessible for inspection, the device being capable of repeated use and furnishing a practical solution for the automatic opening of a parachute at a predetermined barometric pressure.

While the particular form of the device herein described is well adapted to carry out the objects of the present invention, the invention is of the scope set forth in the appended claims.

I claim:

1. A barometric release for a parachute comprising, a shuttle casing, means for attaching a jerk line to said shuttle casing, a precompressed spring within said shuttle casing, a trip member normally restraining movement of said shuttle casing under influence of said precompressed spring, a dashpot connected to said trip member, said dashpot having a vacuum chamber and an air inlet to said vacuum chamber, a valve member controlling the flow to said passage, a diaphragm responsive to atmospheric pressure attached to said member and said casing, and means for adjusting said member to open said passage at a predetermined pressure.

2. A barometric release for a parachute comprising, a shuttle casing, means for attaching a jerk line to said shuttle casing, a precompressed spring within said shuttle casing, a trip member normally restraining movement of said chuttle casing under influence of said precompressed spring, a dashpot connected to said trip member, said dashpot having a vacuum chamber and an air inlet to said vacuum chamber, a valve member controlling the flow to said passage, a diaphragm responsive to atmospheric pressure attached to said member and said casing, means for adjusting said member to open said passage at a predetermined pressure, and an inlet pin normally restraining actuation of said dashpot until removed.

3. A barometric release for a parachute ripcord which comprises: a casing, means for attaching a jerk line to said casing, a precompressed spring within said casing normally urging movement thereof, a trip member including a lever arm normally restraining said movement, a dashpot having a vacuum chamber and an air inlet to said vacuum chamber, said dashpot including a piston connected to a car movable against said lever arm for actuating said trip member, a valve member controlling the flow to said passage, a diaphragm responsive to atmospheric pressure attached to said member and said casing, and means for adjusting said member to open said passage at a predetermined pressure.

References Cited in the file of this patent

UNITED STATES PATENTS

| 2,114,897 | Bird | Apr. 19, 1938 |
| 2,165,954 | Bird | July 11, 1939 |
| 2,584,164 | Stallan | Feb. 5, 1952 |

FOREIGN PATENTS

| 970,849 | France | June 28, 1950 |